(12) United States Patent
Hoshi et al.

(10) Patent No.: US 7,921,699 B2
(45) Date of Patent: Apr. 12, 2011

(54) APPARATUS FOR DETECTING ROTATIONAL POSITION OF INTERNAL COMBUSTION ENGINE

(75) Inventors: Shinya Hoshi, Kariya (JP); Youhei Morimoto, Kariya (JP); Akikazu Kojima, Gamagoori (JP)

(73) Assignee: Denso Corporation, Kariya (JP)

( * ) Notice: Subject to any disclaimer, the term of this patent is extended or adjusted under 35 U.S.C. 154(b) by 163 days.

(21) Appl. No.: 12/351,309

(22) Filed: Jan. 9, 2009

(65) Prior Publication Data

US 2009/0178473 A1    Jul. 16, 2009

(30) Foreign Application Priority Data

Jan. 11, 2008  (JP) .................................. 2008-004439

(51) Int. Cl.
 *G01M 15/04* (2006.01)
(52) U.S. Cl. ................. 73/114.26; 73/114.27; 73/114.28
(58) Field of Classification Search ............... 73/114.16, 73/114.26, 114.27, 114.28
See application file for complete search history.

(56) References Cited

U.S. PATENT DOCUMENTS

| | | | | |
|---|---|---|---|---|
| 4,739,649 A | * | 4/1988 | Tanaka | 73/114.28 |
| 4,744,243 A | * | 5/1988 | Tanaka | 73/114.28 |
| 4,744,244 A | * | 5/1988 | Tanaka | 73/114.16 |
| 4,800,500 A | * | 1/1989 | Tanaka | 701/111 |
| 4,936,137 A | * | 6/1990 | Iwata et al. | 73/114.16 |
| 4,970,667 A | * | 11/1990 | Abo | 702/140 |
| 5,076,098 A | * | 12/1991 | Miwa | 73/114.17 |
| 5,611,311 A | * | 3/1997 | Tomisawa | 123/406.47 |
| 5,945,593 A | * | 8/1999 | Magiera et al. | 73/49.7 |
| 6,367,317 B1 | * | 4/2002 | Jaye | 73/114.16 |
| 6,935,168 B2 | * | 8/2005 | Shimoyama | 73/114.28 |
| 7,278,303 B2 | * | 10/2007 | Piewek et al. | 73/114.16 |
| 7,469,576 B2 | * | 12/2008 | Kruger | 73/114.28 |
| 7,610,139 B2 | * | 10/2009 | Mizuno et al. | 701/102 |

FOREIGN PATENT DOCUMENTS

| | | |
|---|---|---|
| JP | 64-11819 | 2/1989 |
| JP | 3-19500 | 3/1991 |
| JP | 11-210546 | 8/1999 |

\* cited by examiner

*Primary Examiner* — Freddie Kirkland, III
(74) *Attorney, Agent, or Firm* — Nixon & Vanderhye, PC

(57) ABSTRACT

The rotational position detecting apparatus for an internal combustion engine includes a rotational angle sensor outputting a rotation angle signal indicative of a rotational angle of the internal combustion engine, an in-cylinder pressure sensor outputting an in-cylinder pressure signal indicative of an in-cylinder pressure of a cylinder of the internal combustion engine, and a reference rotational position detecting section which detects a specific rotational angle of the internal combustion engine at which the in-cylinder pressure becomes a predetermined reference pressure under a predetermined running condition of the internal combustion engine, and determines the detected specific rotational angle as a reference rotational position of the internal combustion engine. The reference rotational position detecting section detects the specific rotational angle at least a predetermined number of times, and determines an average value of the detected specific rotational angle as the reference rotational position.

4 Claims, 4 Drawing Sheets

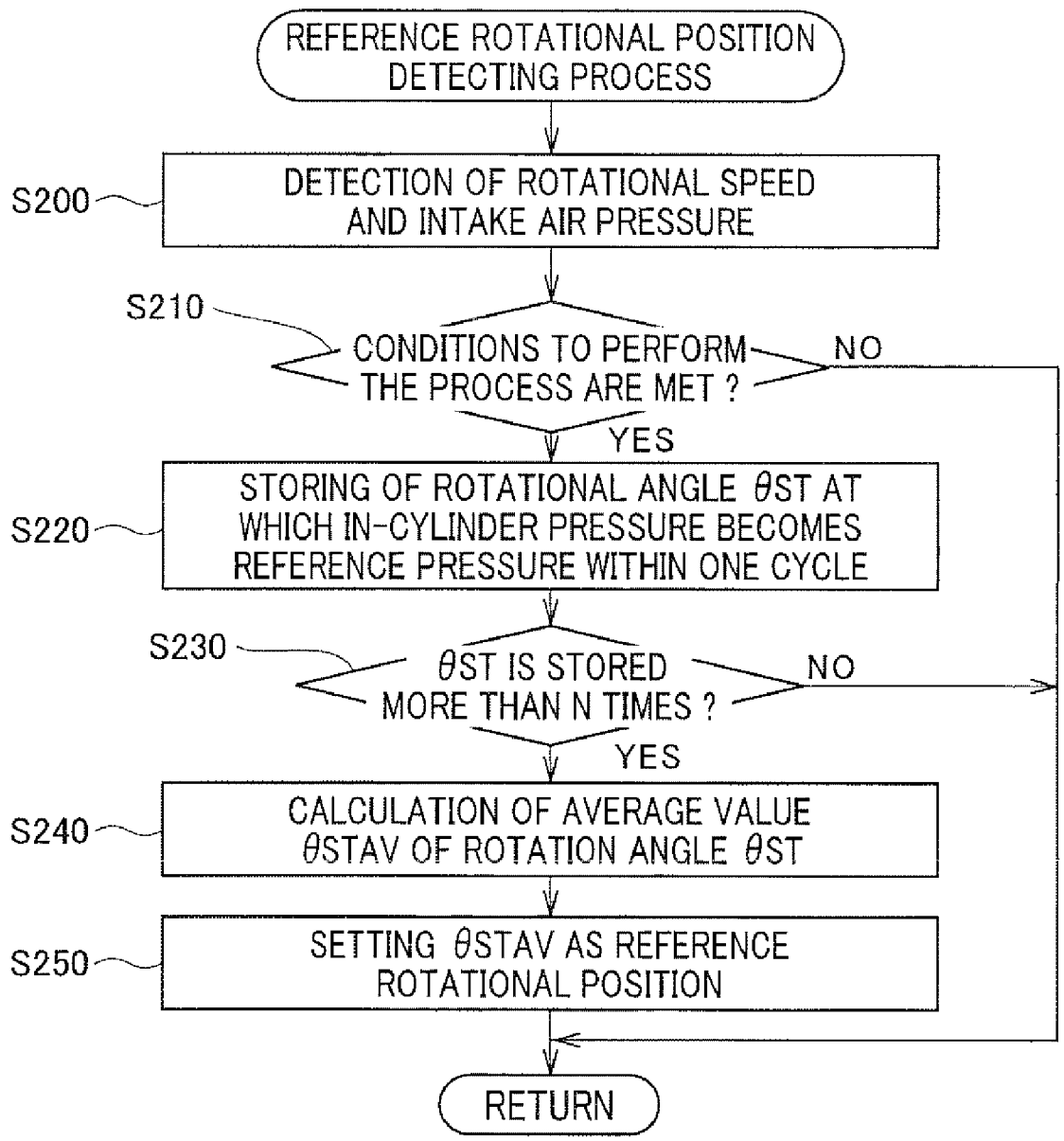

APPARATUS FOR DETECTING ROTATIONAL POSITION OF INTERNAL COMBUSTION ENGINE

CROSS-REFERENCE TO RELATED APPLICATION

This application is related to Japanese Patent Application No. 2008-4439 filed on Jan. 11, 2008, the contents of which are hereby incorporated by reference.

BACKGROUND OF THE INVENTION

1. Field of the Invention

The present invention relates to a rotational position detecting apparatus for detecting a reference rotational position such as a top dead center position of an internal combustion engine on the basis of detection signals outputted from a rotational angle sensor and an in-cylinder sensor.

2. Description of Related Art

Generally, as shown in FIG. 5A, the rotational position of an internal combustion engine is detected by use of an NE sensor (rotational angle sensor) 58 which detects projections (or slots) of a pulser 52 rotating synchronously with a rotating shaft (or crankshaft) of an internal combustion engine.

The pulser 52 having a circular disc shape is formed with projections (or slots) 54 evenly spaced along its circumferential direction. When the pulser 52 rotates with the rotation of the internal combustion engine, the NE sensor 58 outputs a pulse-like rotation angle signal for each predetermined rotation angle of the internal combustion engine as shown in FIG. 5B.

By counting the rotation angle signals outputted from the NE sensor 58, it is possible to determine the rotational position of the internal combustion engine for each one cycle (720° CA) on the basis of which various timings (fuel injection timing, for example) of the internal combustion engine are controlled.

To be more precise, to determine a reference rotational position of the internal combustion engine such as a top dead center position, it is necessary to form, in addition to the projections 54 (or slots), a tooth missing portion 56 or an additional projection in the pulser 52, as shown in FIG. 5A.

However, there has been a problem that the rotational position of the internal combustion engine cannot be correctly determined due to manufacturing tolerances of the pulser teeth or projections 54 (see FIG. 5C), or mounting tolerances of the NE sensor 58 (see FIG. 5D), which cause the phases or intervals of the rotation angle signals outputted from the NE sensor 58 to deviate from nominal values.

Accordingly, to enable correctly detecting the rotational position of the internal combustion engine even if the phases or intervals of the rotation angle signals outputted from the NE sensor 58 deviate from nominal values, it is proposed to detect in-cylinder pressure of a cylinder when the internal combustion engine is in a non-combusting condition, and determine that the cylinder is at a reference rotational position when its in-cylinder pressure reaches its maximum value, assuming that the cylinder is at the top dead center (may be referred to as "TDC" hereinafter) as the reference rotational position when the in-cylinder pressure reaches its maximum value (see FIG. 5E ). For more details, refer to Japanese Patent application Laid-open No. 11-210546, or Japanese Patent Publication No. 3-19500, or Japanese Patent Publication No. 64-11819.

However, noise occurred around the internal combustion engine is likely to superimpose on the detection signal indicative of the in-cylinder pressure outputted from the in-cylinder pressure sensor. Accordingly, since the rotational position at which the in-cylinder pressure obtained from the detection signal outputted from the in-cylinder sensor reaches the maximum value may deviate from the true reference rotational position (TDC position) at which the in-cylinder pressure actually reaches the maximum value (see FIG. 5F), causing detection error of the rotational position.

It may occur that the detection signal outputted from the in-cylinder sensor is subjected to a filtering process to remove the noise therefrom, and the rotational position at which the in-cylinder pressure reaches the maximum value is detected on the basis of the detection signal which has been subjected to the filtering process.

However, in this case, since a phase delay occurs in the detection signal when it is subjected to the filtering process, it is not possible to detect the TDC position with sufficient precision, nor to sufficiently reduce the detection error of the rotational position.

SUMMARY OF THE INVENTION

The present invention provides an apparatus for detecting a rotational position of an internal combustion engine comprising:

a rotational angle sensor outputting a rotation angle signal indicative of a rotational angle of the internal combustion engine;

an in-cylinder pressure sensor outputting an in-cylinder pressure signal indicative of an in-cylinder pressure of a cylinder of the internal combustion engine; and a reference rotational position detecting section which detects a specific rotational angle of the internal combustion engine at which the in-cylinder pressure becomes a predetermined reference pressure under a predetermined running condition of the internal combustion engine on the basis of the rotation angle signal and the in-cylinder pressure signal, and determines the detected specific rotational angle as a reference rotational position of the internal combustion engine;

wherein the reference rotational position detecting section detects the specific rotational angle at least a predetermined number of times, and determines an average value of the detected specific rotational angle as the reference rotational position.

According to the present invention, there is provided an apparatus capable of correctly detecting a rotational position of an internal combustion engine on the basis of output signals of a rotational angle sensor and an in-cylinder pressure sensor mounted on the internal combustion engine, without being affected by external noise superimposing on the output signal of the in-cylinder pressure sensor.

Other advantages and features of the invention will become apparent from the following description including the drawings and claims.

BRIEF DESCRIPTION OF THE DRAWINGS

In the accompanying drawings:

FIG. 4 is a flowchart showing the steps of a variant of the TDC position detecting process.

PREFERRED EMBODIMENTS OF THE INVENTION

Figure 1:
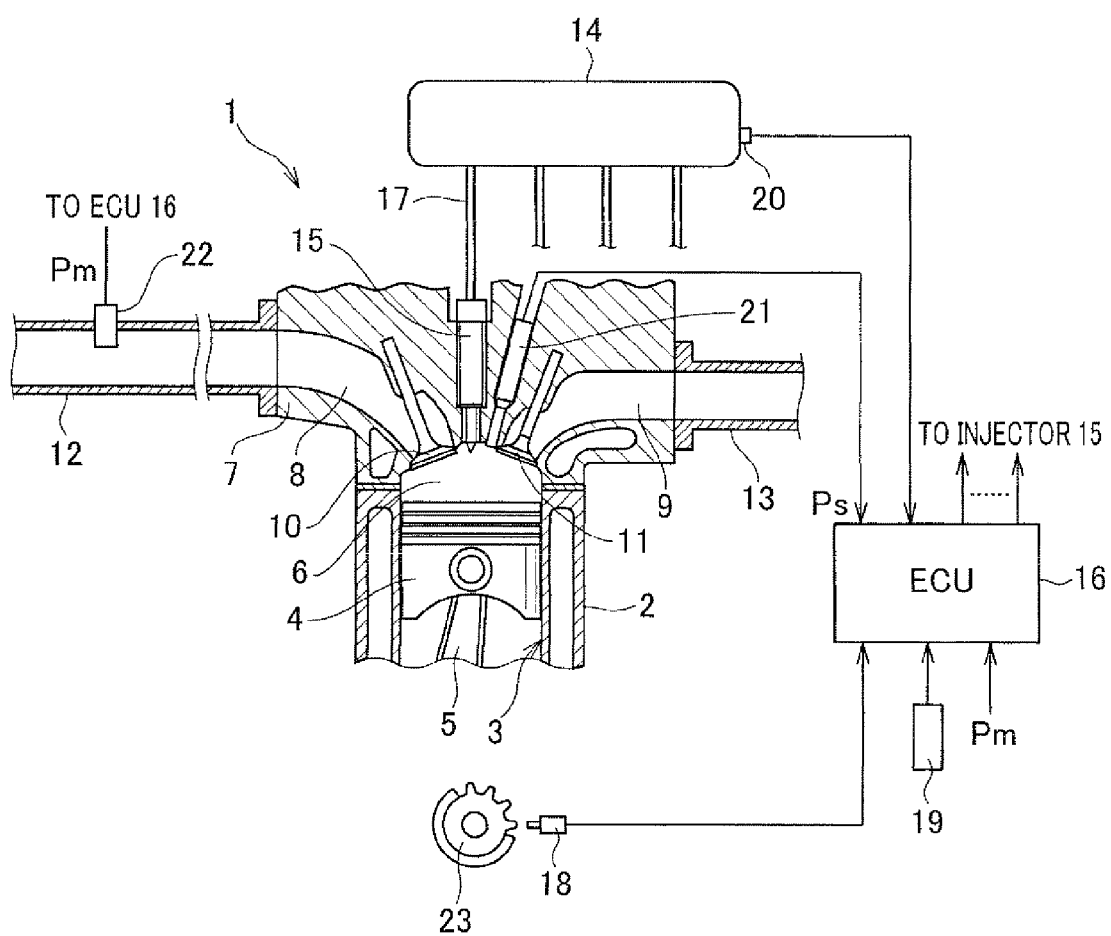
FIG. 1 is a diagram showing an overall structure of an internal combustion engine control system including a rotational position detecting apparatus of an embodiment of the invention.

FIG. 1 is a diagram showing an overall structure of an internal combustion engine control system including a rotational position detecting apparatus of an embodiment of the invention. In this embodiment, the internal combustion engine 1 shown in FIG. 1 is a vehicle-use diesel engine employing an accumulation-type fuel injection system.

In the diesel engine 1, a reciprocatory motion of a piston 4 located inside a cylinder 3 formed in a cylinder block 2 is transmitted to a crankshaft (not shown) of the diesel engine 1 as rotational motion.

A cylinder head 7 which forms combustion chamber 6 above the piston 4 is fixed to the top-end surface of the cylinder block 2. The cylinder head 7 is formed with an inlet port 8 and a discharge port 9 which open to the combustion chamber 6.

The inlet port 8 and the discharge port 9 are opened and closed respectively by an inlet valve 10 and a discharge valve 11 driven by a cam (not shown), respectively. The inlet port 8 is connected with an air intake pipe 12. When the piston 4 descends within the cylinder 3, and as a result, a negative pressure occurs in the cylinder 3 during a suction stroke in which the inlet valve 10 opens the inlet port 8, the air taken into the air intake pipe 12 flows into the cylinder 3 through the inlet port 8.

The discharge port 9 is connected with a discharge pipe 13 for discharging combustion gas. When the piston 4 ascends within the cylinder 3 during a discharge stroke in which the discharge valve 11 opens the discharge port 9, combustion gas is pushed out of the cylinder 3 to flow into the discharge pipe 13 through the discharge port 9.

The accumulation-type fuel injection system includes a common rail 14 accumulating therein high-pressure fuel, a fuel feed pump (not shown) pressure-feeding high-pressure fuel to the common rail 14, and a plurality of injectors 15 each of which injects fuel accumulated in the common rail 14 into a corresponding one of the cylinders of the diesel engine 1. Each of these components is controlled by an ECU (Electronic Control Unit) 16.

The common rail 14 accumulates high-pressure fuel fed by the fuel feed pump at a target rail pressure. The accumulated high-pressure fuel is supplied to the injectors 15 through fuel pipes 17. The target rail pressure of the common rail 14 is set by the ECU 16. In more detail, the ECU 16 detects a running condition of the diesel engine 1 on the basis of an opening degree of an accelerator (engine load), a rotational speed of the diesel engine 1 and so forth, and sets the target rail pressure to a value optimum for the detected running condition.

The injector 15 includes an electromagnetic valve controlled by the ECU 16, and a nozzle which injects fuel in accordance with an open/close operation of the electromagnetic valve. The injector 15 is mounted on the cylinder head 7 such that the tip end thereof projects into the combustion chamber 6.

The ECU 16 receives sensor signals from various sensors shown in FIG. 1 including an NE sensor 18, an accelerator opening degree sensor 19, a fuel pressure sensor 20, an in-cylinder pressure sensor 21, and an intake air pressure sensor 22, and controls the running state of the diesel engine 1 on the basis of the received sensor signals.

Likewise the conventional rotation angle sensor (NE sensor) 58 shown in FIG. 5, the NE sensor 18 is disposed in the vicinity of a pulser 23 which rotates synchronously with the crankshaft of the diesel engine 1. Pulse signals (rotation angle signals) as may as the number of teeth formed in the circumference of the pulser 23 are outputted during a period in which the pulser 23 makes one rotation. The ECU 16 detects the rotational speed NE of the diesel engine 1 by measuring the time interval of the rotation angle signal outputted from the NE sensor 18.

The accelerator opening degree sensor 19 detects the opening degree of the accelerator on the basis of an operated amount (depressed amount) of the accelerator pedal (not shown) by the vehicle driver, and outputs the detected accelerator opening degree to the ECU 16. The fuel pressure sensor 20 mounted on the common rail 14 detects a fuel pressure of fuel accumulated in the common rail 14 (actual rail pressure), and outputs the detected fuel pressure to the ECU 16.

The in-cylinder pressure sensor 21, which is mounted on the cylinder head 7 of each of the cylinders of the diesel engine 1, detects the in-cylinder pressure and outputs the detected in-cylinder pressure to the ECU 16.

The intake air pressure sensor 22, which is mounted on the air intake pipe 12, detects the intake air pressure Pm within the air intake pipe 12, and outputs the detected intake air pressure Pm to the ECU 16. The ECU 16, which has a microcomputer-based structure, performs fuel injection pressure control and fuel injection amount control.

The fuel injection pressure control, which is for controlling the pressure of fuel accumulated in the common rail 14, feedback-controls a discharge amount of the fuel feed pump to keep the actual rail pressure detected by the fuel pressure sensor 20 at the target rail pressure.

The fuel injection amount control, which is for controlling injection amount and injection timing of fuel injected by the injector 15, computes optimum injection amount and optimum injection timing depending on the running condition of the diesel engine 1, and drives the electromagnetic valve of the injector 15 in accordance with the computed results.

The ECU 16 also detects the rotational angle (0°-72°) indicative of the rotational position of the diesel engine 1 for each one cycle. In this embodiment, in order to enable controlling the fuel injection timing etc. with high degree of accuracy even when there is a deviation between the actual rotational position and the detected rotational position of the diesel engine 1 due to mounting tolerances of the NE sensor 18 etc., there is performed a below-described TDC position detecting process in which the rotational angle corresponding to the top dead center (TDC) is detected and set as the reference rotational position for each cylinder.

Figure 2:
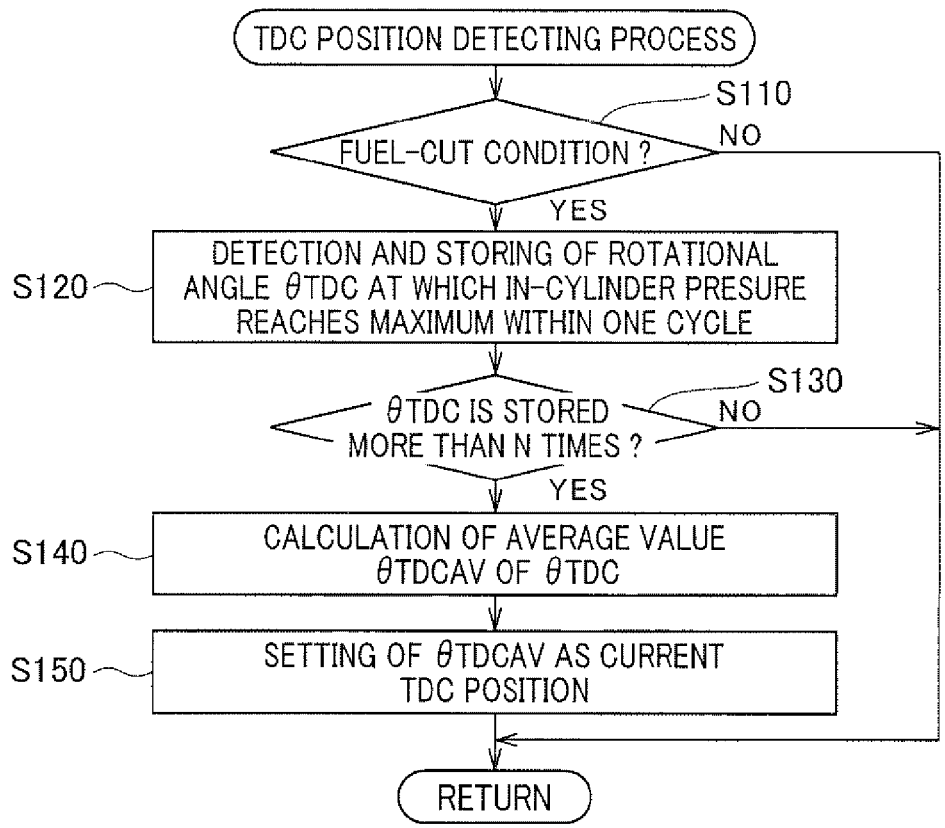
FIG. 2 is a flowchart showing the steps of a TDC (top dead center) position detecting process performed by an ECU included in the internal combustion engine control system shown in FIG. 1.

FIG. 2 is a flowchart showing the steps of the TDC position detecting process. This TDC position detecting process is performed for each cylinder after activation of the ECU 16.

As shown in FIG. 2, the TDC position detecting process begins by determining at step S110 whether or not the vehicle (the diesel engine 1) is decelerating, and fuel cut control is being performed to stop fuel injection in each cylinder.

If the determination result at step S110 is negative, the process is terminated, and otherwise, the process proceeds to step S120. At step S120, during the period of one cycle in which the diesel engine 2 make two rotations, the detection signal outputted from the in-cylinder sensor 21 mounted on the cylinder is sampled, and the rotational angle θTDC of the diesel engine 1 at which the in-cylinder pressure of the cylinder reaches its maximum value is detected. This rotational angle θTDC is stored in a memory device such as RAM included in the ECU 16.

At subsequent step S130, it is determined whether or not the number of the rotational angles θTDC stored in the memory device is equal to or over a predetermined number N. If the determination result at step S130 is negative, the process is terminated.

If the determination result at step S130 is affirmative, the process proceeds to step S140 where the average of the rotational angles θTDC stored in the memory device is calculated as the average angle θTDCAV. Subsequently, the average angle θTDCAV is set as the top dead center position of the cylinder at step S150, and then the process is terminated.

The average angle θTDCAV set as the top dead center position of the cylinder at step S150 is used to calculate a detection error of the rotational position obtained from the rotation angle signals. More specifically, the detection error is calculated as the difference between the average angle θTDCAV set as the top dead center position of the cylinder and the rotation angle determined to correspond to the top dead center on the basis of the detection signals from the NE sensor. This calculated detection error is used to correct parameters (maps for calculating the injection timing and injection amount, for example).

As explained above, in this embodiment, in order to eliminate control error due to deviation between the rotational angle obtained from the rotation angle signals outputted from the NE sensor and the actual rotational position of the diesel engine 1, the TDC position detecting process is performed by the ECU 16 for each cylinder.

Figure 3:
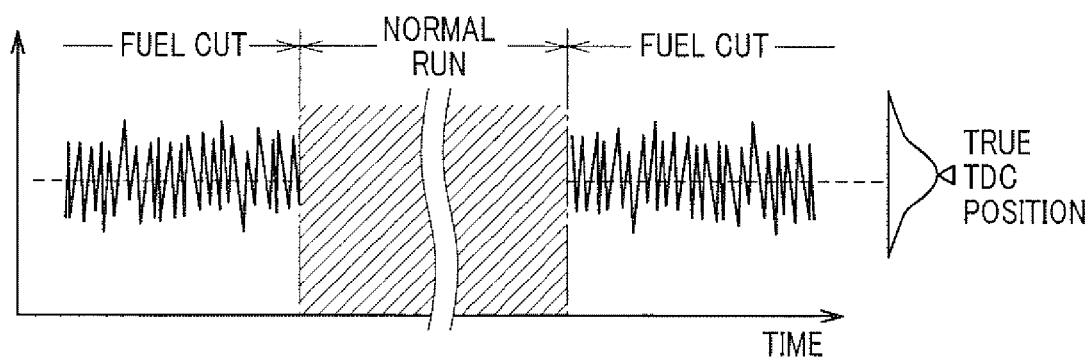
FIG. 3 is a time chart showing deviation between a true TDC position and a rotational angle position at which in-cylinder pressure reaches its maximum value due to external noise.

According to this embodiment, it is possible to correct the detection error of the rotation angle due to mounting tolerances of the NE sensor etc., on the basis of the in-cylinder pressure detected by the in-cylinder sensor 21. In addition, in this embodiment, since a plurality of the rotation angles detected to correspond to the top dead center are averaged, it is possible to detect the top dead center position with a high degree of precision, even when external noise superimposes on the detection signal from the in-cylinder pressure sensor 21, causing the rotational position at which the in-cylinder pressure reaches its maximum value to deviate from the true top dead center position as shown in FIG. 3.

Hence, according to this embodiment, it is possible to correctly determine the reference rotational position for each cylinder without being affected by external noise superimposing on the detection signal outputted from the in-cylinder sensor 21, to thereby accurately correct the control error due to the detection error of the rotational position with reference to the reference rotational position.

It is a matter of course that various modifications can be made to the above described embodiment of the invention. For example, although the above embodiment is configured to detect the top dead center position as the reference rotational position on the basis of the detection signal outputted from the in-cylinder sensor 21, the embodiment may be modified to detect a specific rotational position at which the in-cylinder pressure becomes a predetermined pressure under a specific running condition of the diesel engine 1, and set the detected specific rotational position as the reference rotational position.

In this case, a reference rotational position detecting process shown in the flowchart of FIG. 4 is performed. This reference rotational position detecting process begins by taking in, at step S210, the rotational speed Ne and the intake air pressure Pm of the diesels engine 1 respectively detected by the NE sensor 18 and the intake air pressure sensor 22 as the running condition of the diesel engine 1. Subsequently, it is determined at step S210 whether or not each of the rotational speed Ne and the intake air pressure Pm is within a predetermined range, that is, whether or not conditions to detect the reference rotational position are met.

If the determination result at step S210 is affirmative, the process proceeds to step 5220, and otherwise, the process is terminated.

At step S220, during the period of one cycle in which the diesel engine 1 makes two rotations, the detection signal outputted from the in-cylinder sensor 21 mounted on the cylinder is sampled, and the rotational angle θST of the diesel engine 1 at which the in-cylinder pressure becomes equal to a predetermined reference pressure is detected. This rotational angle θST is stored in a memory device such as RAM included in the ECU 16.

Figure 5A:
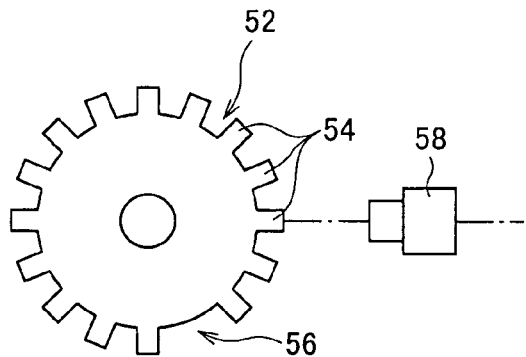
FIGS. 5A to 5F are diagrams for explaining a rotational position detecting apparatus of prior art.
Figure 5B:
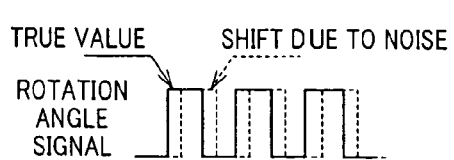
Figure 5C:
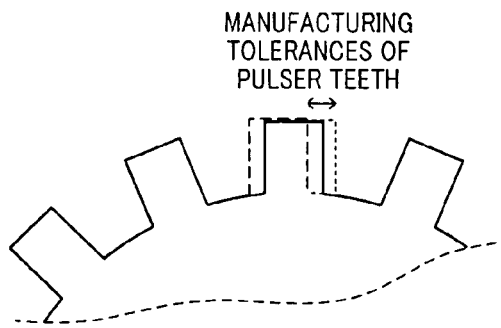
Figure 5D:
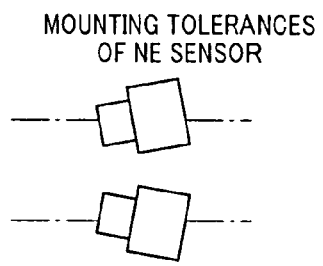
Figure 5E:
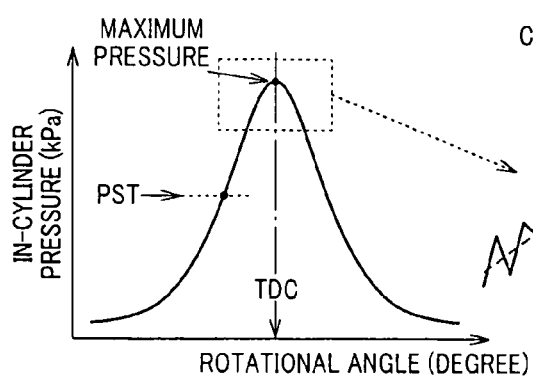
Figure 5F:
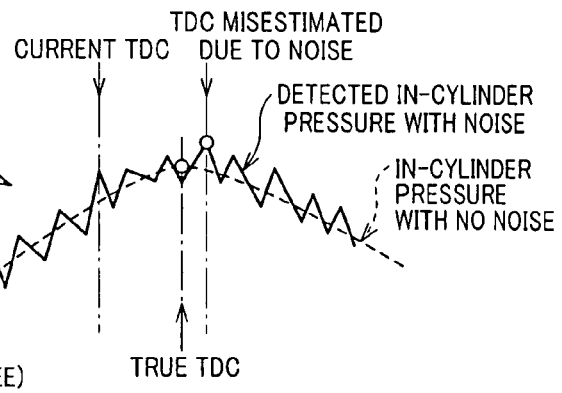

The reference pressure may be set to the in-cylinder pressure which can be reached during a compression cycle before fuel is injected (that is, before fuel ignites) under predetermined running condition of the diesel engine 1 defined by the rotational speed NE and the intake air pressure Pm of the diesel engine 1 (see "PST" in FIG. 5E).

At subsequent step S230, it is determined whether or not the number of the rotational angles θST stored in the memory device is equal to or over a predetermined number N. If the determination result at step S230 is negative, the process is terminated.

On the other hand, if the determination result at step S230 is affirmative, the process proceeds to step S240 where the average of the rotational angles θST stored in the memory device is calculated as the average angle θSTAV. Subsequently, the average angle θSTAV is set as the reference rotational position at step S250, and then the process is terminated.

Hence, according to this reference rotational position detecting process which enables detecting a predetermined rotational position before the top dead center and setting the rotational angel corresponding to the detected rotational position as the reference rotational position, it is possible to accurately correct the control error of the diesel engine 1 due to the detection error of the rotational position obtained from the detected rotational angles as well as the case where the top dead center position is set as the reference rotational position.

The above embodiment is an application of the present invention to an engine control system of a diesel engine. However, the present invention is applicable to an engine control system for an internal combustion engine other than a diesel engine, such as a gasoline engine.

The above embodiment is configured to set the reference rotational position for each of the cylinders of an internal combustion engine, and corrects control parameters separately for each of the cylinders. However, the above embodiment may be modified to detect the reference rotational position such as the top dead center position of one of the cylinders, and correct the control parameters commonly for all the cylinders on the basis of a deviation of the reference rotational position obtained from the rotation angle signals from the true reference rotational position in one of the cylinders.

The above explained preferred embodiments are exemplary of the invention of the present application which is described solely by the claims appended below. It should be understood that modifications of the preferred embodiments may be made as would occur to one of skill in the art.

What is claimed is:

1. An apparatus for detecting a rotational position of an internal combustion engine comprising:

a rotational angle sensor outputting a rotation angle signal indicative of a rotational angle of said internal combustion engine;

an in-cylinder pressure sensor outputting an in-cylinder pressure signal indicative of an in-cylinder pressure of a cylinder of said internal combustion engine; and a reference rotational position detecting section which detects a specific rotational angle of said internal combustion engine at which said in-cylinder pressure becomes a predetermined reference pressure under a predetermined running condition of said internal combustion engine on the basis of said rotation angle signal and said in-cylinder pressure signal, and determines said detected specific rotational angle as a reference rotational position of said internal combustion engine;

wherein said reference rotational position detecting section detects said specific rotational angle at least a predetermined plural number of times when said internal combustion engine is in a combustion state, and determines an average value of said detected specific rotational angle as said reference rotational position.

2. The apparatus according to claim 1, wherein said reference rotational position detecting section detects, when each of an intake air pressure and a rotational speed of said internal combustion engine is at a predetermined value, a rotational angle of said internal combustion engine at which said in-cylinder pressure becomes a predetermined pressure before fuel ignites in said cylinder during a compression cycle of said cylinder at least said predetermined plural number of times, and determines an average value of said detected rotational angle as said reference rotational position.

3. An apparatus for detecting a rotational position of an internal combustion engine comprising:

a rotational angle sensor outputting a rotation angle signal indicative of a rotational angle of said internal combustion engine;

an in-cylinder pressure sensor outputting an in-cylinder pressure signal indicative of an in-cylinder pressure of a cylinder of said internal combustion engine; and a reference rotational position detecting section configured to:

detect a first rotational angle of said internal combustion engine at which said in-cylinder pressure detected by said in-cylinder pressure sensor reaches a maximum value when said internal combustion engine is in a non-combustion condition, to determine said detected first rotational angle as a top dead center position of said cylinder equivalent to said reference rotational position of said internal combustion engine, and detect, when each of an intake air pressure and a rotational speed of said internal combustion engine is at a predetermined value, a second rotational angle of said internal combustion engine at which said in-cylinder pressure becomes a predetermined pressure before fuel ignites in said cylinder during a compression cycle of said cylinder when the internal combustion engine is in a combustion condition, to determine said detected second rotational angle as said reference rotational position.

4. The apparatus according to claim 3, wherein said reference rotational position detecting section detects said first and second specific rotational angles at least a predetermined plural number of times, respectively, determines an average value of said detected first specific rotational angle as said top dead center position, and determines an average value of said detected second specific rotational angle as said reference rotational position.

* * * * *